United States Patent
Shaver et al.

(10) Patent No.: US 12,281,046 B2
(45) Date of Patent: Apr. 22, 2025

(54) HIGH OXYGEN FAST FIRING METHODS FOR CERAMICS MANUFACTURE

(71) Applicant: CORNING INCORPORATED, Corning, NY (US)

(72) Inventors: Rachel Marie Shaver, Painted Post, NY (US); Michael James Vayansky, Elkland, PA (US)

(73) Assignee: Corning Incorporated, Corning, NY (US)

(*) Notice: Subject to any disclaimer, the term of this patent is extended or adjusted under 35 U.S.C. 154(b) by 314 days.

(21) Appl. No.: 18/011,973

(22) PCT Filed: Aug. 17, 2021

(86) PCT No.: PCT/US2021/046195
§ 371 (c)(1),
(2) Date: Dec. 21, 2022

(87) PCT Pub. No.: WO2022/046457
PCT Pub. Date: Mar. 3, 2022

(65) Prior Publication Data
US 2023/0242449 A1    Aug. 3, 2023

Related U.S. Application Data

(60) Provisional application No. 63/072,454, filed on Aug. 31, 2020.

(51) Int. Cl.
*C04B 35/195* (2006.01)
*C04B 35/638* (2006.01)
(Continued)

(52) U.S. Cl.
CPC .......... *C04B 35/195* (2013.01); *C04B 35/638* (2013.01); *C04B 35/64* (2013.01);
(Continued)

(58) Field of Classification Search
None
See application file for complete search history.

(56) References Cited

U.S. PATENT DOCUMENTS

| | | |
|---|---|---|
| 4,001,028 A | 1/1977 | Frost et al. |
| 6,027,684 A | 2/2000 | Gheorghiu et al. |

(Continued)

FOREIGN PATENT DOCUMENTS

| | | |
|---|---|---|
| CN | 1272833 A | 11/2000 |
| CN | 102630219 A | 8/2012 |

(Continued)

OTHER PUBLICATIONS

International Search Report and Written Opinion of the International Searching Authority; PCT/US21/46195; dated Nov. 2, 2020; 12 pages; European Patent Office.

(Continued)

*Primary Examiner* — Robert J Grun
(74) *Attorney, Agent, or Firm* — Kevin M. Able (57) ABSTRACT

A method for firing a green honeycomb body and for manufacturing a cordierite honeycomb body. The honeycomb body is heated from an initial kiln temperature to a first kiln temperature that is from about 300° C. to 400° C., at an oxygen concentration greater than 16%. The honeycomb body is heated to a second kiln temperature that is from about 600° C. to 700° C. at a second heating rate of greater than 125° C./hr. The honeycomb body is heated to a third kiln temperature that is from about 800° C. to 900° C. at a third heating rate that is less than or equal to the second heating rate. The honeycomb body is heated to a fourth kiln temperature that is from about 1300° C. to 1450° C. at a fourth heating rate that is less than or equal to the third heating rate.

20 Claims, 3 Drawing Sheets

(51) Int. Cl.
*C04B 35/64* (2006.01)
*C04B 38/00* (2006.01)

(52) U.S. Cl.
CPC .. *C04B 38/0006* (2013.01); *C04B 2235/3481* (2013.01); *C04B 2235/349* (2013.01); *C04B 2235/6021* (2013.01); *C04B 2235/6562* (2013.01); *C04B 2235/6567* (2013.01); *C04B 2235/6584* (2013.01); *C04B 2235/661* (2013.01); *C04B 2235/95* (2013.01)

(56) References Cited

U.S. PATENT DOCUMENTS

| | | |
|---|---|---|
| 6,099,793 A | 8/2000 | Dull et al. |
| 6,541,407 B2 | 4/2003 | Beall et al. |
| 6,818,580 B2 | 11/2004 | Kumazawa et al. |
| 8,148,297 B2 | 4/2012 | Backhaus-Ricoult et al. |
| 9,221,192 B2 | 12/2015 | Beall et al. |
| 9,446,560 B2 | 9/2016 | Bronfenbrenner et al. |
| 9,452,578 B2 | 9/2016 | Bronfenbrenner et al. |
| 10,000,424 B2 | 6/2018 | Beall et al. |
| 2004/0262820 A1 | 12/2004 | Brennan et al. |
| 2011/0127699 A1 | 6/2011 | Vayansky et al. |
| 2013/0140742 A1 | 6/2013 | Okazaki |
| 2013/0152532 A1 | 6/2013 | Merkel et al. |
| 2014/0252695 A1 | 9/2014 | Beall et al. |
| 2015/0028527 A1 | 1/2015 | Bronfenbrenner et al. |
| 2018/0148382 A1 | 5/2018 | Wing |
| 2019/0218147 A1 | 7/2019 | Kitaguchi et al. |

FOREIGN PATENT DOCUMENTS

| | | |
|---|---|---|
| CN | 105517975 A | 4/2016 |
| CN | 107635947 A | 1/2018 |

OTHER PUBLICATIONS

Chinese Patent Application No. 202180046598.6, Office Action dated Jun. 28, 2023, 5 pages (English translation only), Chinese Patent Office.

HIGH OXYGEN FAST FIRING METHODS FOR CERAMICS MANUFACTURE

CROSS REFERENCE TO RELATED APPLICATION

This is a national stage application under 35 U.S.C. § 371 of International Application No. PCT/US2021/046195, filed on Aug. 17, 2021, which claims the benefit of priority under 35 U.S.C. § 119 of U.S. Provisional Application Ser. No. 63/072,454 filed on Aug. 31, 2020, the content of which is relied upon and incorporated herein by reference in their entireties.

BACKGROUND

1. Field

This disclosure generally relates to the manufacture of ceramic bodies, more particularly to the firing green honeycomb bodies and, more specifically, to firing cordierite-forming green honeycomb bodies.

2. Technical Background

Ceramic honeycomb bodies are used in a variety of applications, including the treatment of a fluid stream, such as catalytic converter and/or particulate filter assemblies useful in the aftertreatment of the exhaust of an internal combustion engine. The manufacture of ceramic honeycomb bodies may involve the firing of green honeycomb bodies.

SUMMARY

Disclosed herein is a method for firing a cordierite-forming green honeycomb body in a kiln, comprising heating the green honeycomb body in a first stage from an initial kiln temperature to a first kiln temperature that is from about 300° C. to 400° C. at a first heating rate of at most 100° C./hr, wherein an oxygen concentration during the first stage is greater than 16%; heating the green honeycomb body in a second stage from the first kiln temperature to a second kiln temperature that is from about 600° C. to 700° C. at a second heating rate of greater than 125° C./hr; heating the green honeycomb body from the second kiln temperature to a third kiln temperature that is from about 800° C. to 900° C. at a third heating rate that is less than or equal to the second heating rate; and heating the green honeycomb body in a fourth stage from the third kiln temperature to a fourth kiln temperature that is from about 1300° C. to 1450° C. at a fourth heating rate that is less than or equal to the third heating rate.

In some embodiments, the second heating rate is at least 150° C./hr.

In some embodiments, the second heating rate is from 130° C./hr to 175° C./hr.

In some embodiments, the green honeycomb body comprises an organic load, a hydrous clay, a hydrous talc, or a combination thereof.

In some embodiments, the green honeycomb body comprises an organic load of from 2.5 wt % to 20 wt % as superaddition with respect to a total weight of inorganics in the green honeycomb body.

In some embodiments, the green honeycomb body comprises an organic load of at least 10 wt % as superaddition with respect to a total weight of inorganics in the green honeycomb body.

In some embodiments, the green honeycomb body comprises an organic load of at least 15 wt % as superaddition with respect to a total weight of inorganics in the green honeycomb body.

In some embodiments, the organic load comprises an organic binder, an oil, a lubricant, or a combination thereof.

In some embodiments, the green honeycomb body comprises at least 15 wt % of the hydrous clay.

In some embodiments, the green honeycomb body comprises from 10 wt % to 20 wt % of the hydrous clay.

In some embodiments, the green honeycomb body comprises at least 40 wt % of the hydrous talc.

In some embodiments, the green honeycomb body comprises from 35 wt % to 45 wt % of the hydrous talc.

In some embodiments, the green honeycomb body has a maximum cross-sectional dimension from 2 inches to 15 inches.

In some embodiments, the green honeycomb body has a maximum cross-sectional dimension from 3 inches to 9 inches.

In some embodiments, the green honeycomb body has an axial length from 1 inch to 18 inches.

In some embodiments, the green honeycomb body has an axial length from 3 inches to 10 inches.

In some embodiments, the fourth kiln temperature is a top kiln temperature and the method further comprises maintaining the top kiln temperature for at least 5 hours.

Disclosed herein is a method of manufacturing a porous cordierite honeycomb body comprising the method of firing of any of the above paragraphs.

In some embodiments, the method further comprises forming a batch mixture comprising hydrous clay, hydrous talc, and an organic load and shaping the batch mixture into the green honeycomb body before firing the green honeycomb body.

In some embodiments, the batch mixture comprises extruding the batch mixture through a honeycomb extrusion die.

Disclosed herein is a method for firing a cordierite-forming green honeycomb body comprising an organic load, a hydrous clay, and a hydrous talc, the method comprising: heating the green honeycomb body in a first stage from an initial kiln temperature to a first kiln temperature at a first heating rate of at most 100° C./hr, wherein an oxygen concentration during the first stage is greater than 16% and wherein the first kiln temperature is reached after an organic burnout event ends; heating the green honeycomb body in a second stage from the first kiln temperature to a second kiln temperature at a second heating rate of greater than 125° C./hr, wherein the second kiln temperature is reached after a clay water loss event starts; heating the green honeycomb body from the second kiln temperature to a third kiln temperature at a third heating rate that is less than or equal to the second heating rate; wherein the third kiln temperature is reached before a talc water loss event starts; and heating the green honeycomb body in a fourth stage from the third kiln temperature to a fourth kiln temperature that is from about 1300° C. to 1450° C. at a fourth heating rate that is less than or equal to the third heating rate.

In some embodiments, the second heating rate is at least 150° C./hr.

In some embodiments, the second heating rate is from 130° C./hr to 175° C./hr.

In some embodiments, the green honeycomb body comprises from 35 wt % to 45 wt % of the hydrous talc.

In some embodiments, the green honeycomb body comprises from 10 wt % to 20 wt % of the hydrous clay.

In some embodiments, the green honeycomb body comprises an organic load of from 2.5 wt % to 20 wt % as superaddition with respect to a total weight of inorganics in the green honeycomb body.

Disclosed herein is a method of manufacturing a porous cordierite honeycomb body comprising the method of firing of any of the above paragraphs.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Modifications of the disclosure will occur to those skilled in the art and to those who make or use the disclosure. Therefore, it is understood that the embodiments shown in the drawings and described herein are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to also include the specific value or end-point referred to.

Any directional terms as used herein—for example up, down, right, left, front, back, top, bottom—are made only with reference to the figures as drawn and are not intended to imply absolute orientation.

Reference will now be made in detail to embodiments for manufacturing ceramic honeycomb bodies. These methods include methods of firing the green honeycomb ceramic bodies. In accordance with embodiments, the green honeycomb ceramic body can be fired in a kiln in multiple stages. For example, the stages can be set with respect to temperatures corresponding to one or more events, such as exothermic or endothermic events, that occur within the honeycomb body during firing. For example, the events can be present depending on the components in the batch mixture, such as organic burn out, clay water loss, and talc water loss. In this way, the stages can be arranged to span over corresponding kiln temperature ranges, with the heating rates (alternatively, "ramp rates") and oxygen concentrations in each stage set to decrease the total time required to fire the honeycomb bodies while maintaining low rates of cracking.

Figure 1:
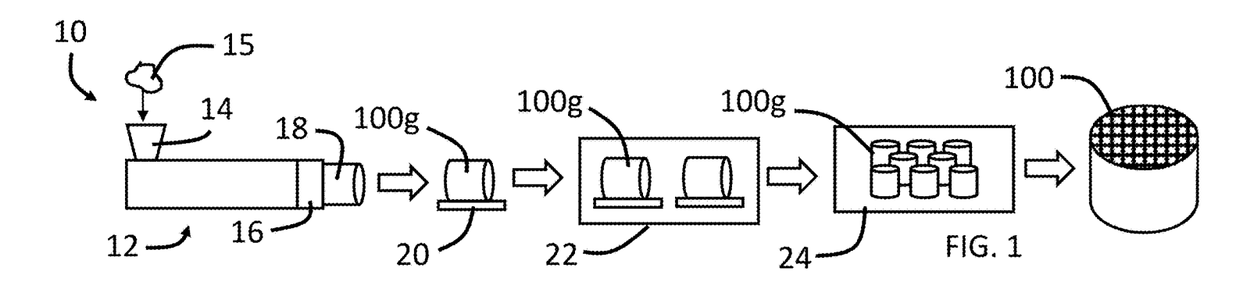
FIG. 1 schematically illustrates a manufacturing system for manufacturing ceramic honeycomb bodies according to one embodiment disclosed herein.

Referring to FIG. 1, a manufacturing system 10 is illustrated for ultimately forming ceramic honeycomb bodies 100. The manufacturing system 10 comprises an extruder 12 that comprises an inlet 14, such as a hopper, for receiving a mixture 15 of ceramic-forming components, which may be referred to herein as the batch mixture 15. The extruder 12 can comprise one or more rotatable screws, a ram, or other mechanism for mixing and/or pressurizing the batch mixture 15 within the body of the extruder 12.

The extruder 12 comprises an extrusion die 16 through which the pressurized batch mixture 15 is forced. For example, the extrusion die 16 can comprise a plurality of slots corresponding to the honeycomb structure of the ceramic honeycomb body 100 through which an extrudate 18 is extruded. Lengths of the extrudate 18 can be cut off (e.g., via a blade, saw, vibratory cutter, laser, wire, etc.) to form one or more green honeycomb bodies 100g. The green honeycomb bodies 100g can be placed on a tray, belt, sheet, conveyor, or other transport mechanism 20 or combination of transport mechanisms for transport to subsequent manufacturing steps. The green honeycomb bodies 100g can be dried in a dryer 22 to remove water or other liquid carrier present, e.g., using elevated temperature, air flow, microwaves, etc. After drying, the dry green honeycomb bodies 100g can be transported to a kiln 24 in which the green honeycomb bodies 100g are fired. As described herein, the firing process can be used to convert the green honeycomb bodies 100g into the ceramic honeycomb bodies 100.

The batch mixture 15 can one or more ceramic and/or ceramic-forming materials (e.g., that result in one or more ceramic phases to be formed in the ceramic honeycomb body 100 during firing) that may be collectively referred to herein as "ceramic precursors", an organic binder such as methylcellulose (e.g., to enable extrudability in the desired shape of the green body 100g and maintain green strength during subsequent manufacturing steps), extrusion aids such as a lubricating oil (e.g., to reduce extrusion pressure, reduce friction of abrasive particles in the batch mixture, and/or impart a desired rheology to the batch mixture), sintering aids to assist in the sintering together of ceramic components during firing (e.g., to increase strength of the ceramic honeycomb body 100 after firing), and a liquid carrier such as water (e.g., to enhance mixability and extrudability of the batch mixture).

In some embodiments, the ceramic precursors are selected so that the ceramic body 100, as a result of firing, comprises a primary phase of cordierite (greater than 50 wt % cordierite). In some embodiment, the ceramic honeycomb body 100 comprises at least 85 wt % cordierite, at least 90 wt % cordierite, or even at least 95 wt % cordierite. The cordierite of the ceramic body 100 can approximate the stoichiometry $Mg_2Al_4Si_5O_{18}$, as described, for example, in U.S. Pat. No. 6,541,407, which is incorporated herein by reference in its entirety. To this end, the batch mixture 15, and correspondingly the green body 100g, comprise a magnesia source, an alumina source, and a silica source in amounts such that the ratios of these oxides also approximate the stoichiometry of cordierite. In some embodiments, an aluminosilicate clay, such as kaolin clay, is provided as both a source of alumina and as a source of silica. In some embodiments, talc is provided as both a source of magnesia and as a source of silica. Any other suitable source of magnesia, alumina, and/or silica known or discovered in the ceramic body forming arts can be utilized.

In some embodiments, the batch mixture 15, and correspondingly the green honeycomb body 100g, has an organic load (total amount of all organic components) of at least 2.5 wt %, at least 5 wt %, at least 10 wt %, or even at least 15 wt %, such as up to 20 wt %, each value as super addition with respect to a total weight of the inorganics (e.g., the ceramic precursors) in the batch mixture, including ranges having these values as endpoints, such as from about 2.5 wt % to about 20 wt %, from about 2.5 wt % to about 15 wt %, from about 2.5 wt % to about 10 wt %, from about 2.5 wt % to about 5 wt %, from about 5 wt % to about 20 wt %, from about 5 wt % to about 15 wt %, from about 5 wt % to about 10 wt %, from about 10 wt % to about 20 wt %, from about 10 wt % to about 15 wt %, or even from about 15 wt % to about 20 wt %, each range again given in wt % super addition. The total weight of inorganics as referred to herein is considered with respect to when the batch mixture is dry, i.e., before addition of water or other liquid vehicle. To this end, the organic load can be determined as the sum of carbon-containing components in the green body 100g, such as oils (e.g., mineral oil, polyalphaolefin, etc.), or extrusion aids, lubricants, or other additives (e.g., fatty acids, tall oil, palm olein, oleic acid, etc.) and the organic binder (e.g., methylcellulose).

In some embodiments, the organic load in the batch mixture and/or green honeycomb body comprises methylcellulose in an amount of at least 2 wt %, at least 2.5 wt %, at least 3 wt %, at least 4 wt %, at least 5 wt %, or even at least 6 wt %, such as up to 10 wt %, each value as super addition with respect to the total weight of inorganics in the batch mixture, including ranges and subranges having these values as endpoints, such as from about 2 wt % to about 10 wt %, from about 2 wt % to about 6 wt %, from about 2 wt % to about 5 wt %, from about 2 wt % to about 4 wt %, from about 2 wt % to about 3 wt %, from about 2.5 wt % to about 10 wt %, from about 2.5 wt % to about 6 wt %, from about 2.5 wt % to about 5 wt %, from about 2.5 wt % to about 4 wt %, from about 2.5 wt % to about 3 wt %, from about 3 wt % to about 10 wt %, from about 3 wt % to about 6 wt %, from about 3 wt % to about 5 wt %, from about 3 wt % to about 4 wt %, from about 4 wt % to about 10 wt %, from about 4 wt % to about 6 wt %, from about 4 wt % to about 5 wt %, from about 5 wt % to about 10 wt %, from about 5 wt % to about 6 wt %, or even from about 6 wt % to about 10 wt %.

In some embodiments, the organic load in the batch mixture and/or green honeycomb body comprises a total of oils (e.g., mineral oil, polyalphaolefin, etc.) and other additives, aids, or lubricants (e.g., fatty acids, tall oil, palm olein, oleic acid, etc.) in an amount of at least 0.5 wt %, at least 1 wt %, at least 2 wt %, at least 3 wt %, at least 4 wt %, at least 5 wt %, at least 6 wt %, at least 7 wt %, at least 8 wt %, at least 9 wt %, or even at least 10 wt %, such as up to 12 wt %, each value given as a super addition with respect to a total weight of inorganics, including ranges having these values as endpoints, such as from about 0.5 wt % to about 12 wt %, from about 1 wt % to about 12 wt %, from about 2 wt % to about 12 wt %, from about 3 wt % to about 12 wt %, from about 4 wt % to about 12 wt %, from about 5 wt % to about 12 wt %, from about 6 wt % to about 12 wt %, from about 7 wt % to about 12 wt %, from about 8 wt % to about 12 wt %, from about 9 wt % to about 12 wt %, or even from about 10 wt % to about 12 wt %.

In some embodiments, the batch mixture and/or green honeycomb body comprises one or more of talc and clay (e.g., kaolin clay) in a hydrated or hydrous form. In some embodiments, the batch mixture comprises hydrated talc in an amount of at least 15 wt %, at least 30 wt %, at least 35 wt %, or even at least 40 wt %, such as up to 45 wt % or 50 wt %, each value given with respect to the total weight of inorganics, including ranges including these values as endpoints, such as from about 15 wt % to about 50 wt %, from about 30 wt % to about 50 wt %, from about 30 wt % to about 45 wt %, from about 30 wt % to about 40 wt %, from about 30 wt % to about 35 wt %, from about 35 wt % to about 50 wt %, from about 35 wt % to about 45 wt %, from about 35 wt % to about 40 wt %, or even from about 40 wt % to about 50 wt % or from about 40 wt % to about 45 wt %.

In some embodiments, the batch mixture comprises a hydrated clay in an amount of at least 10 wt %, or even at least 15 wt %, such as up to 20 wt %, up to 18 wt %, up to 17 wt %, or even up to 16 wt %, with each value given with respect to the total weight of inorganics, including ranges having these values as endpoints, such as from about 10 wt % to about 20 wt %, from about 10 wt % to about 18 wt %, from about 10 wt % to about 17 wt %, from about 10 wt % to about 16 wt %, from about 15 wt % to about 20 wt %, from about 15 wt % to about 18 wt %, from about 15 wt % to about 17 wt %, or from about 15 wt % to about 16 wt %. If additional amounts of clay are desired to be used, anhydrous (e.g., calcined) clay can be added to the batch in addition to the hydrated clay. For example, in some embodiments anhydrous clay is additionally added in an amount from 3 wt % to 35 wt %, such as from 10 wt % to 25 wt %. The inventors have found that limiting the amount of hydrated clay (e.g., to a maximum of at most 16 wt % to 20 wt %) in the batch can advantageously assist in enabling the use of increasingly higher heating rates (e.g., at least 150° C./hr) and/or result in a reduced tendency for the honeycomb bodies to crack, during a stage of firing in which a clay water loss event occurs (the "second stage" as described herein). For example, limiting the amount of hydrated clay correspondingly reduces the magnitude of the temperature change that occurs due to the endothermic nature of the clay water loss event.

The porosity of the formed ceramic body is not particularly limited. In embodiments, the porosity of the formed ceramic body is at least 30%, at least 40%, at least 50%, at least 60%, such as up to 65% or even 70%, including ranges including these values as endpoints, such as from 30% to 70%, from 40% to 70%, from 50% to 70%, from 60% to 70%, from 30% to 65%, from 40% to 65%, from 50% to 65%, from 60% to 65%, from 50% to 60%, from 30% to 50%, or from 40% to 50%.

In embodiments, the ceramic honeycomb body 100 is a cylinder or prism having a diameter of from about 2 inches to about 14 inches, including subranges. In some embodiments, the ceramic honeycomb body can have a diameter (or maximum cross-sectional dimension) of at least 2 inches, at least 3 inches, at least 4 inches, or at least 6 inches, such as up to at least 9 inches, 12 inches, or even 15 inches, including ranges having these values as endpoints, such as from 2 inches to 15 inches, from 2 inches to 12 inches, from 2 inches to 9 inches, from 2 inches to 6 inches, from 3 inches to 15 inches, from 3 inches to 12 inches, from 3 inches to 9 inches, from 3 inches to 6 inches, from 4 inches to 15 inches, from 4 inches to 12 inches, from 4 inches to 9 inches, from 4 inches to 6 inches, from 6 inches to 15 inches, from 6 inches to 12 inches, from 6 inches to 9 inches, from 9 inches to 15 inches, from 9 inches to 12 inches, or even from 12 inches to 15 inches.

In some embodiments, the cylinder is an elliptic cylinder in which one or both diameters that define the ellipsoidal end faces of the elliptic cylinder are within the ranges stated herein. In embodiments in which the ceramic honeycomb body is a prism, the "diameter" as referred to herein corresponds to the maximum cross-sectional dimension (e.g., between a corner and an edge or another corner) of the polygonal-shaped end faces of the prism (e.g., between opposite corners of the rectangular face of a rectangular prism shaped honeycomb body).

The honeycomb body can have any suitable dimensions. In some embodiments, the ceramic honeycomb body (e.g., arranged as a cylinder or prism) has an axial length of at least 1 inch, at least 3 inches, at least 6 inches, at least 9 inches, at least 12 inches, or even at least 15 inches, such as up to 18 inches, including ranges having these values as endpoints, such as from 1 inch to 18 inches, from 1 inch to 15 inches, from 1 inch to 12 inches, from 1 inch to 9 inches, from 1 inch to 6 inches, from 1 inch to 3 inches, from 3 inches to 18 inches, from 3 inches to 15 inches, from 3 inches to 12 inches, from 3 inches to 9 inches, from 3 inches to 6 inches, from 6 inches to 18 inches, from 6 inches to 15 inches, from 6 inches to 12 inches, from 6 inches to 9 inches, from 9 inches to 18 inches, from 9 inches to 15 inches, from 9 inches to 12 inches, from 12 inches to 18 inches, from 12 inches to 15 inches, or from 15 inches to 18 inches.

In embodiments, the honeycomb ceramic body may have an aspect ratio of from about 0.50 to about 2.00, such as from about 0.75 to about 1.50, or from about 1.00 to about 1.25.

Figure 2:
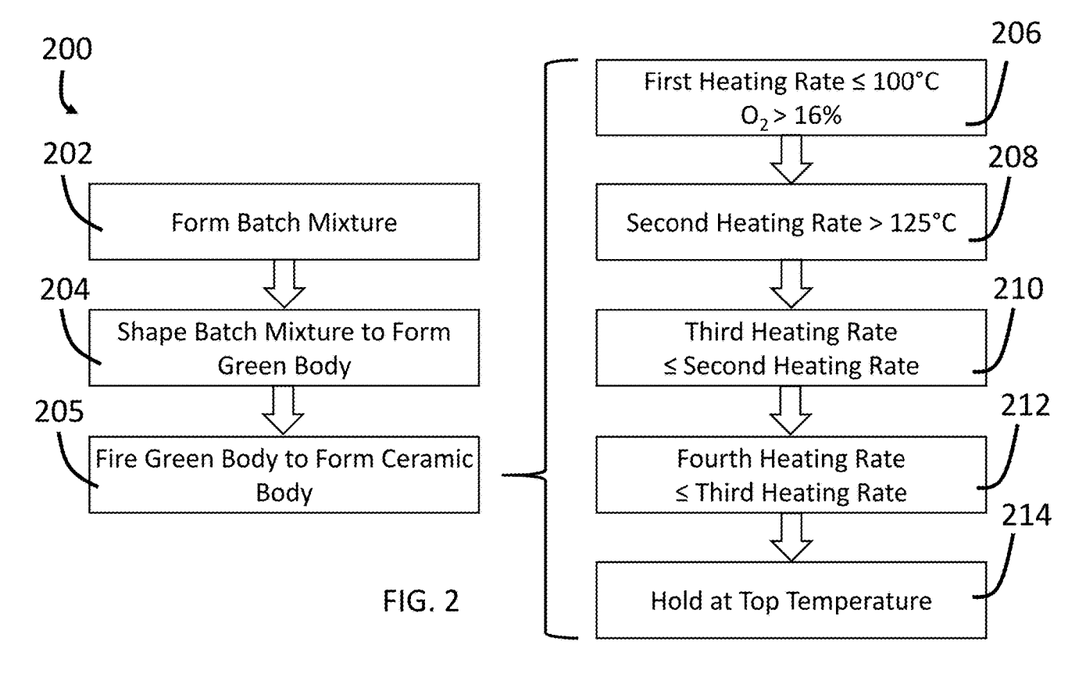
FIG. 2 is a flow chart illustrating a method of manufacturing a ceramic honeycomb body, which also comprises a method of firing a green honeycomb body.

FIG. 2 is a flow chart illustrating a method 200 for manufacturing ceramic honeycomb bodies (e.g., the ceramic honeycomb bodies 100). In step 202, a batch mixture (e.g., the batch mixture 15) is formed. For example, as described herein, the batch mixture can comprise one or more ceramic precursors (ceramic or ceramic-forming components), an organic binder, one or more pore formers, one or more extrusion aids, one or more sintering aids, and a liquid vehicle. At step 204, the batch mixture is shaped into green honeycomb bodies (e.g., the green honeycomb body 100g). In some embodiments, step 204 comprises extrusion of the batch mixture through a honeycomb extrusion die (e.g., the extrusion die 16) of an extruder (e.g., the extruder 12). Step 204 can also comprise cutting the green honeycomb bodies to length and/or drying the green honeycomb bodies to remove the liquid vehicle (e.g., water). At step 205 the green honeycomb bodies are fired in a kiln (e.g., the kiln 24) to form the ceramic honeycomb bodies, e.g., via reaction of ceramic precursors and/or sintering together of ceramic particles.

In accordance with embodiments described herein, step 205 can be considered as a method of firing green honeycomb bodies. The method of step 205 comprises heating the green honeycomb bodies in a kiln in multiple stages, which is designated in FIG. 2 starting at step 206.

In step 206, the green honeycomb body is heated in a first stage from an initial temperature, e.g., ambient or room temperature, to a first temperature at a first heating rate and a first oxygen concentration. The heating rate during the first stage, or any other stage, can be constant over the entire stage or variable (that is, increase or decrease at various points during the corresponding stage). Accordingly, any reference herein to the "heating rate" of a stage, if not otherwise stated, is intended to refer to a maximum heating rate over the course of that stage (e.g., the maximum heating rate in a stage that has a variable heating rate). Reference to the kiln temperatures of the stages herein correspond to the set point temperature of the kiln. For ease of discussion, the unit of "hour" may be abbreviated as "hr" or simply "h" herein.

In some embodiments, the initial temperature is from 10° C. to 40° C., such as from 20° C. to 30° C. (e.g., "room temperature"). In some embodiments, the first temperature is approximately 350° C., such as from 300° C. to 400° C., from 325° C. to 400° C., from 350° C. to 400° C., from 325° C. to 350° C., from 325° C. to 375° C., or from 350° C. to 375° C. In some embodiments, the first temperature is selected such that the first temperature is not reached until after the end of an organic burn out event (e.g., the burn out of oils, organic binders, pore formers and/or other organics from the green honeycomb bodies). As described further herein, particularly with respect to FIG. 4, the organic burnout event can be identified experimentally in organics-containing green honeycomb bodies as an exothermic event during firing. Exothermic events can be identified, for example, by observing the change in temperature of the green honeycomb body over time in comparison to the kiln temperature, or by analytical techniques such as differential scanning calorimetry (DSC), or thermal gravimetric analysis (TGA).

In some embodiments, the first heating rate used in the first stage is less than or equal to about 100° C./hr. For example, in some embodiments, the heating rate used in the first stage is variable or constant in a range from 25° C./hr to 100° C./hr, such as from 25° C./hr to 75° C./hr, from 50° C./hr to 75° C./hr, or from 50° C./hr to 100° C./hr. The heating rate in the first stage may depend on the size of the honeycomb ceramic body that is being fired and/or the type and/or amount of the organic load in the green honeycomb body. For example, relatively smaller-sized honeycomb ceramic bodies (e.g., having shorter axial lengths and/or smaller diameters) and/or honeycomb bodies having lower organic loads, may generally be able to be heated without cracking at relatively higher heating rates, e.g., the higher heating rate values provided such as up to 100° C./hr, while larger honeycomb bodies and/or honeycomb bodies comprising relatively larger organic loads, may generally benefit from relatively lower heating rates, e.g., the lower heating rate values provided, such as a maximum heating rate of 75° C./hr or 50° C./hr.

In some embodiments, the oxygen concentration in the first stage is greater than 16%, greater than 17%, or even greater than 18%, such as from 16% to 21%, from 17% to 21%, from 18% to 21%, from 16% to 20%, or from 17% to 20%. For example, during the first stage the kiln can be open to atmosphere (atmosphere typically having a oxygen concentration of approximately 21%), e.g., without any oxygen control on the kiln. The oxygen concentration can variably shift or fluctuate within this range over the course of the first stage. For example, the oxygen concentration can decrease in response to increased oxygen consumption by burners of the kiln, as the kiln burners consume more oxygen to support the increased heating rate and/or higher temperatures.

In step 208, the green honeycomb body is heated during a second stage from the first temperature to a second temperature at a second heating rate. In some embodiments, the second temperature is approximately 650° C., such as from 600° C. to 700° C., from 625° C. to 700° C., from 650° C. to 700° C., from 625° C. to 675° C., from 625° C. to 650° C., or from 650° C. to 675° C. In some embodiments, the second temperature is selected such that it is reached after a clay water loss event has started, such as containing all or part of the clay water loss event.

For example, the clay water loss event can be identified in a clay-containing green honeycomb body as an endothermic event that occurs in a temperature range of 500° C. to 600° C. for the honeycomb body (which may differ from the temperature of the kiln, as described further herein). Similar to the organic burnout event, a clay water loss event can be identified experimentality by observing the temperature of the green honeycomb body in comparison to the kiln temperature over time and/or with the assistance of any suitable analytical technique such as DSC or TGA.

According to the embodiments disclosed herein, the second heating rate used in the second stage is advantageously greater than 125° C., such as at least 130° C., at least 135° C., at least 140° C., at least 145° C., or preferably even at least 150° C. For example, in some embodiments, the second heating rate used in the second stage is variable or constant in a range from 130° C. to 175° C., from 135° C. to 175° C., from 140° C. to 175° C., from 145° C. to 175° C., or even from 150° C. to 175° C. Advantageously, such high heating rates throughout the stage that includes at least a portion of the clay water loss event can result in a significant time savings, e.g., on the scale of at least a few hours, such as two or more hours savings, in comparison to firing cycles that use slower heating rates during clay water loss.

In step 210, the green honeycomb body is heated during a third stage from the second temperature to a third temperature at a third heating rate. In some embodiments, the third temperature is approximately 850° C., such as from 800° C. to 900° C., from 825° C. to 900° C., from 850° C. to 900° C., from 825° C. to 875° C., from 825° C. to 850° C., or from 850° C. to 875° C. In some embodiments, the third temperature is selected such that it is reached prior to the start of a talc water loss event. For example, the talc water loss event can be identified in talc-containing green honeycomb bodies as an endothermic event that occurs approximately in the honeycomb body temperature range of 850° C. to 950° C. Similar to the organic burnout event and the clay water loss event, the talc water loss event can be identified experimentality by observing the temperature of the green honeycomb body in comparison to the kiln temperature over time and/or with the assistance of any suitable analytical technique such as DSC or TGA.

According to embodiments disclosed herein, the third heating rate is less than or equal to the second heating rate. In some embodiments, the third heating rate is up to 175° C./hr, up to 150° C./hr, or up to 125° C./hr, such as from 100° C. to 150° C. In some embodiments, the third heating rate is less than the second heating rate in order to better enable the honeycomb body temperature, which has dropped relative to the kiln temperature due to the endothermic nature of the clay water loss event, to "catch up" to the kiln temperature. In this way, the relatively lower heating rate in the third stage can be useful to reduce the formation of significantly high thermal gradients in the honeycomb body prior to the talc water loss event starting. For example, this reduction of thermal gradients in the third stage can be particularly advantageous in reducing or eliminating cracking of the honeycomb bodies during the talc water loss event.

In step 212, the green honeycomb body is heated in a fourth stage from the third temperature to a fourth temperature at a fourth heating rate. In some embodiments, the fourth temperature is in a range sufficient for reaction and/or sintering of ceramic and ceramic-precursors in the green honeycomb bodies to occur. For example, with respect to cordierite-precursors, the fourth temperature can be at least 1300° C., at least 1325° C., at least 1350° C., at least 1375° C., or even at least 1400° C., such as in a range from 1300° C. to 1450° C.

According to embodiments disclosed herein, the fourth heating rate is less than or equal to the third heating rate. In some embodiments, the fourth heating rate is up to 125° C./hr, up to 100° C./hr, up to 75° C./hr, or up to 50° C., such as from 50° C. to 125° C., from 50° C. to 100° C., from 50° C. to 75° C., from 75° C. to 125° C., or from 75° C. to 100° C. In some embodiments, the fourth heating rate is less than the third heating rate in order to better accommodate the talc water loss event in talc-containing green honeycomb bodies, e.g., to maintain small temperature gradients within the green honeycomb body during the talc water loss event. The heating rate(s) in the fourth stage can also be used for influencing the formation of ceramic microstructure for the ceramic honeycomb body as the kiln temperature approaches its top hold or top soak temperature.

In step 214, the firing method of step 205 comprises a fifth stage in which a top temperature hold (which may be referred to as a "top soak") is implemented for a time sufficient to complete conversion of the ceramic precursors in the green honeycomb body into the final ceramic phases of the ceramic body (via reaction and/or sintering of ceramic and/or ceramic precursors). The duration of the top temperature hold is not particularly limited and can be as long as required to complete formation of the final ceramic body. In some embodiments, the isothermal hold is at most 20 hours, at most 18 hours, at most 15 hours, at most 12 hours, or even at most 10 hours, such as in the range from 5 hours to 20 hours or other range including these values as endpoints.

Figure 3:
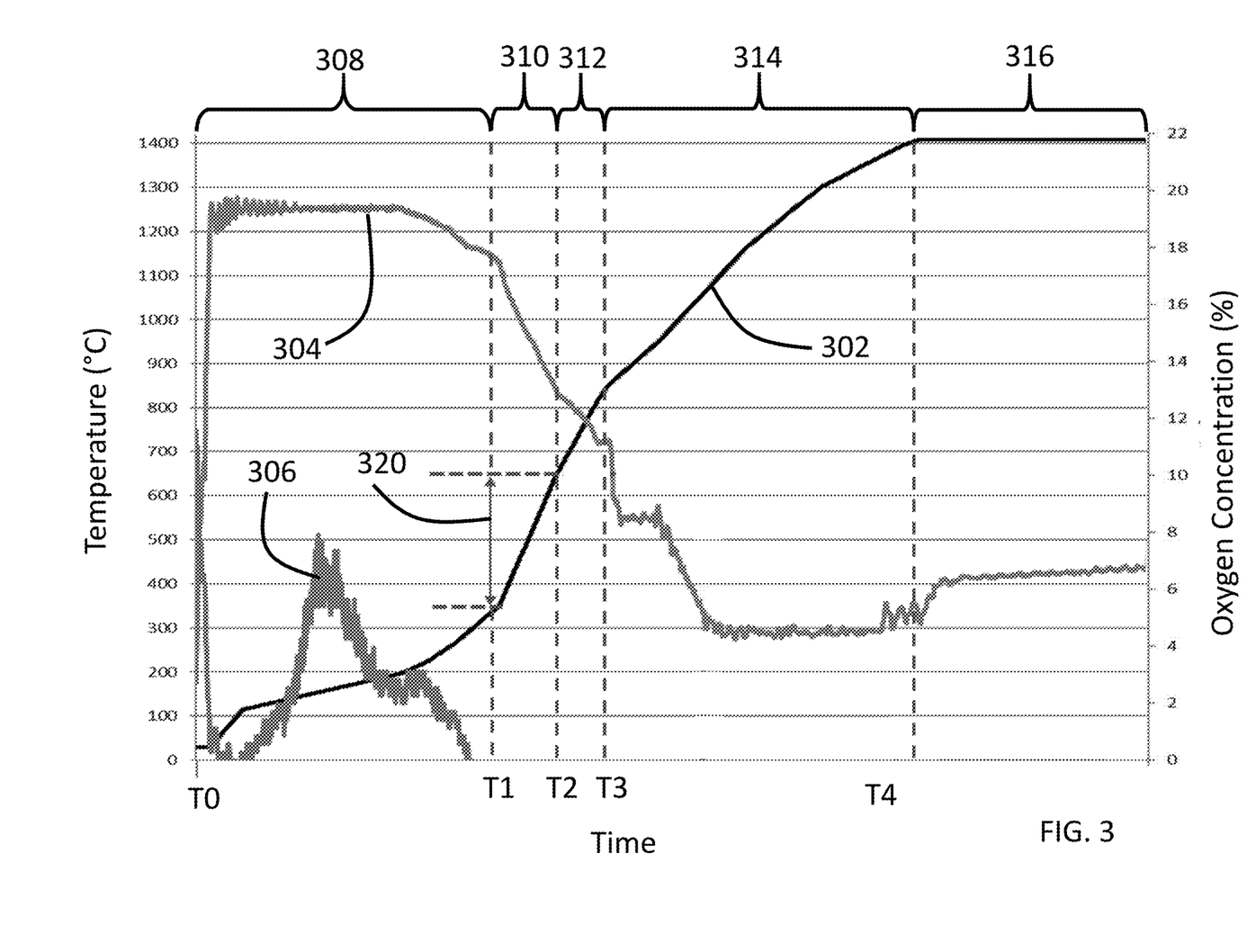
FIG. 3 is a graph showing a kiln temperature, kiln oxygen concentration, and kiln volatile organic compound concentration over time for one example of firing a green honeycomb body.
Figure 4:
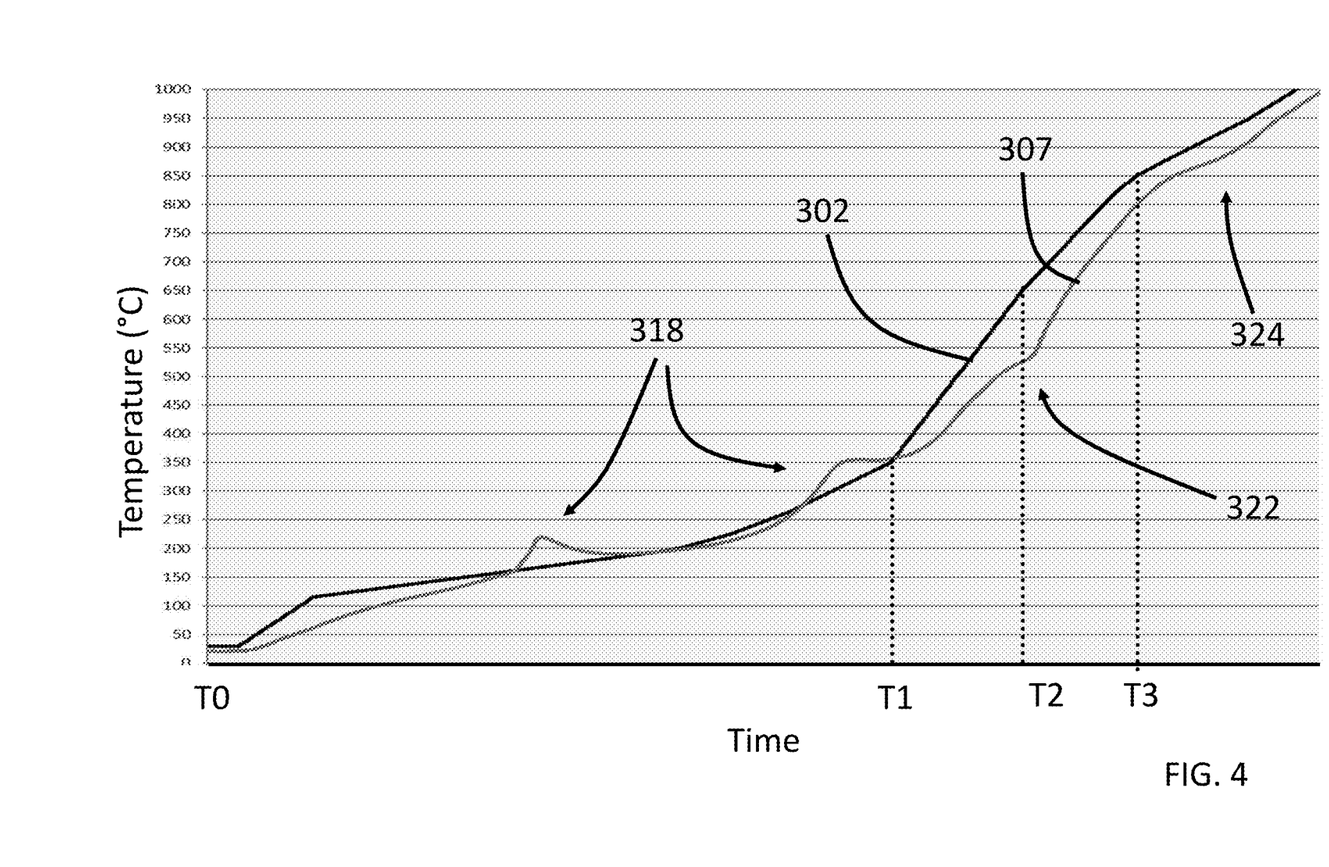
FIG. 4 is a graph showing a kiln temperature and a honeycomb body temperature over time corresponding to the example of FIG. 3.

Referring now to FIGS. 3-4, graphs are illustrated for an example firing cycle. More particularly, in FIG. 3, kiln temperature, designated by reference numeral 302, kiln oxygen concentration, designated by reference numeral 304, and kiln volatile organic compound (VOC) concentration, designated by reference numeral 306, are each plotted with respect to time during the firing of a green honeycomb body according to one example. FIG. 4 illustrates both the kiln temperature (the respective portion of plot 302 from FIG. 3 is reproduced) and the honeycomb body temperature, designated by reference numeral 307, with respect to time. Since the temperature plots are illustrated with respect to time, the slope of the temperature plots at any given time corresponds to the heating rate at that time.

The green honeycomb body used to generate the graphs of FIGS. 3 and 4 comprised approximately 12 wt % to 15.5 wt % hydrous clay, 40 wt % to 41 wt % talc, and 14 wt % to 22.5 wt % calcined (anhydrous) clay as cordierite-precursors, with respect to a total weight of inorganics in the green honeycomb body and with the balance of the total weight of inorganics made up by a combination of alumina and silica to approximately achieve the stoichiometric ratios for cordierite as described herein. The green honeycomb body also comprised a total organic load of 7.2 wt % to 9.9 wt % as super addition with respect to the total weight of inorganics. More particularly, the organic load in this example comprised from about 2.7 wt % methylcellulose to about 3.3 wt % methylcellulose, from about 3.8 to about 6.5 wt % oil, and from about 0.5 wt % to about 1.75 wt % additional lubricant, each value given as super addition with respect to the total weight of inorganics in the green honeycomb body.

In accordance with the above description of the method of step 205, FIG. 3 illustrates a multi-stage firing cycle. Namely, FIG. 3 illustrates a first stage 308 extending from an initial kiln temperature (e.g., room or ambient temperature) at an initial time T0 to a first kiln temperature at first time T1, a second stage 310 extending from the first kiln temperature (at first time T1) to a second kiln temperature at a second time T2, a third stage 312 extending from the second kiln temperature (at the second time T2) to a third kiln temperature at a third time T3, a fourth stage 314 extending from the third kiln temperature (at the third time T3) to a fourth kiln temperature at a fourth time T4, and a fifth stage 316 at which the kiln is held at the fourth kiln temperature after the fourth time T4. The times T1, T2, and T3 are correspondingly also shown in FIG. 4, which contains a time period that covers some of the first stage 308, the entireties of the second and third stages 310, 312, and a portion of the fourth stage 314.

In accordance with the discussion of the step 206 above, the first stage 308 spans a time period in which there is a high level of organic burnout, as indicated by the VOC plot 306 between the initial time T0 and the first time T1. It can be seen that during the highest levels of organic burnout (as indicated by the peak in the VOC plot 306), the kiln temperature heating rate (determined as the slope of the kiln temperature plot 302) is maintained at a relatively low value, e.g., from 50° C. to 75° C., with slightly higher rates in the first stage 308 before and after the highest amount of organic burnout occurs, e.g., up to rates of about 100° C. The first kiln temperature (at first time T1) in the example of FIGS. 3 and 4 is approximately 350° C.

Additionally, in accordance with the above description of step 206, the length of the first stage 308 can be set such that first kiln temperature at the time T1 is reached after the organic burnout event is completed (as indicated by the VOC plot 306 dropping to zero). Correspondingly, from FIG. 4 the organic burnout of the various organic components can be identified as various exothermic events (positive temperature deviations of the honeycomb body temperature plot 307 with respect to the kiln temperature plot 302). The individual exothermic events that comprise the organic burnout event are designated with reference numeral 318. Accordingly, the first kiln temperature at the first time T1 in FIG. 4 occurs at a temperature of about 350° C., which is after the organic burn out events have completed.

Additionally, as indicated by the oxygen concentration plot 304, the oxygen concentration during the first stage 308 is between about 17% to 20%, which was accomplished by providing air from the ambient atmosphere to the kiln.

In accordance with the above discussion of step 208, FIGS. 3 and 4 show a second heating rate implemented from the first kiln temperature (at first time T1) to the second kiln temperature (at second time T2). In FIG. 3, the first kiln temperature (at time T1) is about 350° C. and the second kiln temperature (at time T2) is approximately 650° C., which is indicated in FIG. 3 as a fast fire temperature segment 320. Accordingly, the second heating rate of the kiln temperature during the second stage 310 is at a significantly increased rate, greater than 125° C./hr, such as a rate of 150° C./hr. As described herein, since the fast firing temperature segment 320 shown in FIG. 3 contains at least a portion of a clay water loss event, embodiments according to the current disclosure advantageously provide time savings in comparison to firing cycles that use relatively slower heating rates during clay water loss.

Generally in accordance with the above description of step 208, the length of the second stage 308 can be set such that second kiln temperature at the time T2 is reached after the start of a clay water loss event, e.g., in some embodiments the time T2 is reached during the clay water loss event, or even after the clay water loss event has completed. From FIG. 4, the clay water loss event can be identified as an endothermic event (negative temperature deviation of the honeycomb body temperature plot 307 with respect to the kiln temperature plot 302), which occurs at a honeycomb body temperature of about 550° C. and is designated with reference numeral 322. Due largely to the endothermic nature of the clay water loss event, the honeycomb body temperature of 550° C. at the end of the clay water loss event "lags behind" the second kiln temperature at the second time T2, which is at about 650° C.

As also generally described above with respect to step 210, a third heating rate in FIGS. 3 and 4 is implemented during the third stage 312 from the second kiln temperature (at second time T2) to the third kiln temperature at the third time T3. In the example of FIG. 3, the third kiln temperature (at the third time T3) is about 850° C. As described above, the third heating rate in the third stage 310 is less than the second heating rate in the second stage 308, e.g., at about 125° C./hr.

Additionally, in accordance with the above description of step 210, the length of the third stage 310 can be set such that third kiln temperature at the time T3 is reached before the start of a talc water loss event. From FIG. 4, the talc water loss event can be identified as an endothermic event (negative temperature deviation of the honeycomb body temperature plot 307 with respect to the kiln temperature plot 302), which starts at a honeycomb body temperature of approximately 850° C. (corresponding to a kiln temperature of approximately 900° C., and is designated with reference numeral 324. Accordingly, the third temperature of the kiln at time T3 in FIG. 4 occurs at a temperature of about 850° C., which is before the talc water loss event occurs at the kiln temperature of about 900° C.

As described above with respect to step 212, a fourth heating rate (maximum heating rate over a range of heating rates) is implemented during the fourth stage 314 from the third kiln temperature (at third time T3) to a fourth kiln temperature at the fourth time T4, which may be referred to and/or implemented as, a top hold or soak temperature for the firing cycle. In the example of FIG. 3, the fourth kiln temperature (at the fourth time T4) is about 1410° C., and therefore sufficient for the conversion of the cordierite-precursors into a cordierite phase for the ceramic honeycomb body.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method for firing a cordierite-forming green honeycomb body in a kiln, comprising:
heating the green honeycomb body in a first stage from an initial kiln temperature to a first kiln temperature that is from about 300° C. to 400° C. at a first heating rate of at most 100° C./hr, wherein an oxygen concentration during the first stage is greater than 16%;

heating the green honeycomb body in a second stage from the first kiln temperature to a second kiln temperature that is from about 600° C. to 700° C. at a second heating rate of greater than 125° C./hr;

heating the green honeycomb body in a third stage from the second kiln temperature to a third kiln temperature that is from about 800° C. to 900° C. at a third heating rate that is less than or equal to the second heating rate; and heating the green honeycomb body in a fourth stage from the third kiln temperature to a fourth kiln temperature that is from about 1300° C. to 1450° C. at a fourth heating rate that is less than or equal to the third heating rate.

2. The method of claim 1, wherein the second heating rate is from 130° C./hr to 175° C./hr.

3. The method of claim 1, wherein the green honeycomb body comprises an organic load, a hydrous clay, a hydrous talc, or a combination thereof.

4. The method of claim 3, wherein the green honeycomb body comprises an organic load of from 2.5 wt % to 20 wt % as superaddition with respect to a total weight of inorganics in the green honeycomb body.

5. The method of claim 3, wherein the green honeycomb body comprises an organic load of at least 10 wt % as superaddition with respect to a total weight of inorganics in the green honeycomb body.

6. The method of claim 3, wherein the organic load comprises an organic binder, an oil, a lubricant, or a combination thereof.

7. The method of claim 3, wherein the green honeycomb body comprises at least 15 wt % of the hydrous clay.

8. The method of claim 3, wherein the green honeycomb body comprises from 10 wt % to 20 wt % of the hydrous clay.

9. The method of claim 3, wherein the green honeycomb body comprises at least 40 wt % of the hydrous talc.

10. The method of claim 3, wherein the green honeycomb body comprises from 35 wt % to 45 wt % of the hydrous talc.

11. The method of claim 1, wherein the green honeycomb body has a maximum cross-sectional dimension from 2 inches to 15 inches.

12. The method of claim 1, wherein the green honeycomb body has an axial length from 1 inch to 18 inches.

13. The method of claim 1, wherein the fourth kiln temperature is a top kiln temperature and the method further comprises maintaining the top kiln temperature for at least 5 hours.

14. A method of manufacturing a porous cordierite honeycomb body comprising:

forming a batch mixture comprising hydrous clay, hydrous talc, and an organic load;

shaping the batch mixture into a cordierite-forming green honeycomb body; and firing the cordierite-forming green honeycomb body in a kiln according to the method of claim 1.

15. The method of claim 14, wherein shaping the batch mixture comprises extruding the batch mixture through a honeycomb extrusion die.

16. A method for firing a cordierite-forming green honeycomb body comprising an organic load, a hydrous clay, and a hydrous talc, the method comprising:

heating the green honeycomb body in a first stage from an initial kiln temperature to a first kiln temperature at a first heating rate of at most 100° C./hr, wherein an oxygen concentration during the first stage is greater than 16% and wherein the first kiln temperature is reached after an organic burnout event ends;

heating the green honeycomb body in a second stage from the first kiln temperature to a second kiln temperature at a second heating rate of greater than 125° C./hr, wherein the second kiln temperature is reached after a clay water loss event starts;

heating the green honeycomb body from the second kiln temperature to a third kiln temperature at a third heating rate that is less than or equal to the second heating rate; wherein the third kiln temperature is reached before a talc water loss event starts; and heating the green honeycomb body in a fourth stage from the third kiln temperature to a fourth kiln temperature that is from about 1300° C. to 1450° C. at a fourth heating rate that is less than or equal to the third heating rate.

17. The method of claim 16, wherein the second heating rate is from 130° C./hr to 175° C./hr.

18. The method of claim 16, wherein the green honeycomb body comprises from 35 wt % to 45 wt % of the hydrous talc.

19. The method of claim 16, wherein the green honeycomb body comprises from 10 wt % to 20 wt % of the hydrous clay.

20. The method of claim 16, wherein the green honeycomb body comprises an organic load of from 2.5 wt % to 20 wt % as superaddition with respect to a total weight of inorganics in the green honeycomb body.

* * * * *